United States Patent

[11] 3,580,617

| [72] | Inventor | Hermann Ehrenberg<br>Langen-Hessen, Germany |
|---|---|---|
| [21] | Appl. No. | 828,795 |
| [22] | Filed | May 28, 1969 |
| [45] | Patented | May 25, 1971 |
| [73] | Assignee | Fouquet-Werk Frauz & Planck<br>Rottenburg Neckar, Germany |
| [32] | Priority | May 28, 1968 |
| [33] | | Germany |
| [31] | | P 17 50 710.7 |

[54] PIPE UNION
13 Claims, 4 Drawing Figs.

[52] U.S. Cl. .................................................. 285/340,
285/348, 285/354
[51] Int. Cl. ...................................................... F16l 19/08
[50] Field of Search ........................................... 285/340,
354, 348, 386, 247 (Cursory), 248 (Cursory), 249 (Cursory)

[56] References Cited
UNITED STATES PATENTS

| 3,072,421 | 1/1963 | Lloyd et al. ................. | 285/340X |
|---|---|---|---|
| 3,116,945 | 1/1964 | Blomquist et al. ............ | 285/340X |
| 3,140,107 | 7/1964 | Hynes .......................... | 285/340X |
| 3,233,925 | 2/1966 | Stevens ....................... | 285/340X |
| 3,365,219 | 1/1968 | Nicolaus ...................... | 285/340X |
| 3,367,684 | 2/1968 | Anderson ..................... | 285/340X |
| 3,429,596 | 2/1969 | Marshall ...................... | 285/340X |

*Primary Examiner*—Thomas F. Callaghan
*Attorney*—Michael S. Striker

ABSTRACT: Two pipes have axially aligned proximal end portions. A sleeve surrounds the end portions with clearance and has an annular radially inwardly extending projection which forms an inner annular ridge located between the facing axial endfaces of the pipe end portions. At each axial side of the annular projection a scaling ring is received in the clearance, followed by a pressure-transmitting ring. Nuts are screwed exteriorly onto each axial sleeve end, surround the same and the associated pipe end portion, and deforming the sealing rings through the intermediary of the associated pressure-transmitting rings into sealing engagement with the sleeve and the associated pipe end portion.

PATENTED MAY 25 1971

Inventor:
HERMANN EHRENBERG

By Michael S. Striker
Attorn.

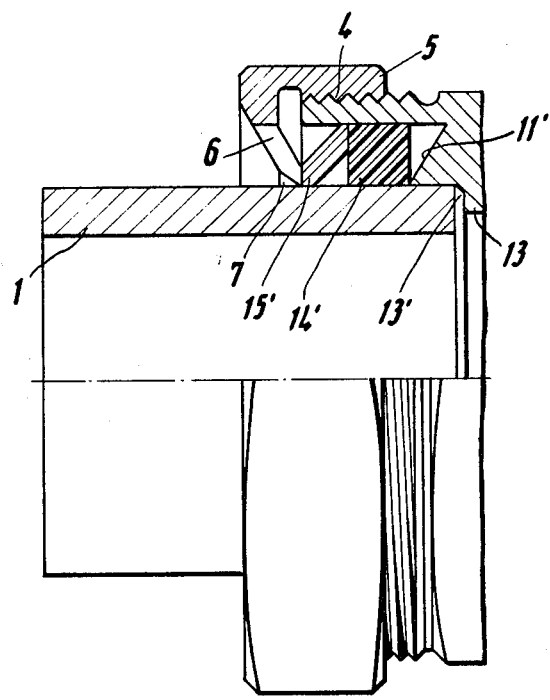

PIPE UNION

BACKGROUND OF THE INVENTION

The present invention relates generally to pipe unions, and more particularly to pipe unions for the pressuretight connection of two pipes.

Still more specifically, the invention relates to pipe unions for pressure-tightly connecting pipes with a high tolerance range such as set forth in German Industrial Norm DIN 2440.

Where such tolerance ranges are present—for specific details of which reference may be had to the aforementioned DIN 2440—it is necessary to take special precautions in order to meet the specified requirements. Existing pipe unions for this purpose have not been found satisfactory in various respects and there has heretofore existed a definite need for an improved pipe union capable of meeting these requirements fully.

SUMMARY OF THE INVENTION

It is, accordingly, a general object of my invention to provide a pipe union capable of meeting the aforementioned requirements.

More particularly, it is an object of the invention to provide such a pipe union which, while meeting the requirements in question, is nevertheless inexpensive in its construction and simple in its assembly.

In pursuance of the above objects, and others which will become apparent hereafter, one feature of the invention resides in the provision of a pipe union which, briefly stated, comprises a pair of pipes having axially aligned proximal end portions; a sleeve surrounding the end portions with radial clearance and comprising a radially inwardly projecting annular portion having an inner annular ridge located between the axial endfaces of the end portions; a pair of sealing rings of elastically deformable material each received in the clearance at one axial side of the annular portion in abutment therewith; a pair of pressure-transmitting rings each also received in the clearance axially of and in contact with the respective sealing ring; and nut means operative for engaging the sleeve and the end portions for thereby maintaining the former against movement relative to the latter, and for effecting stress transmission to said rings in a sense resulting in sealing contact of the sealing rings with the sleeve and end portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view similar to FIG. 1, but illustrating a different embodiment of the invention;

DESCRIPTION OF THE PREFERRED EMBODIMENTS

Figure 1:
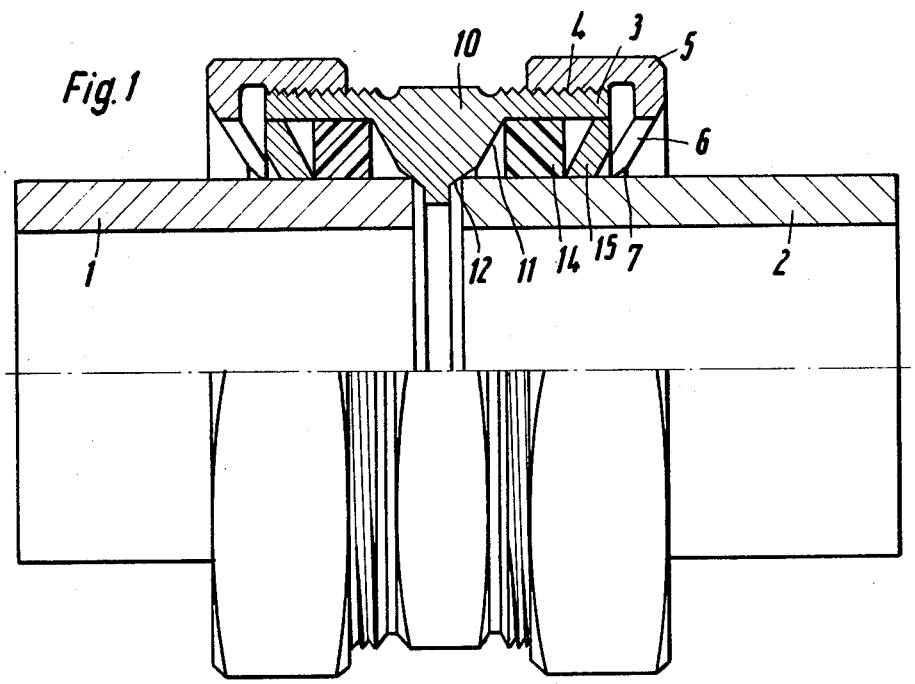
FIG. 1 is a side view, partially in axial section, of a pipe union in accordance with one embodiment of my invention.

Discussing firstly FIG. 1, it will be seen that the end portions 1 and 2 of two nonillustrated pipes are arranged proximal to one another, that is adjacent but out of contact. They are surrounded by a sleeve 3 whose outer circumferential surface is provided at its opposite axial ends with screw threads 4 one of which should be understood to be a left-hand thread while the other is a right-hand thread.

Intermediate its ends the sleeve 3 is provided with a radially inwardly extending annular projection 10 which is inwardly extended in form of a radial ridge 13; the latter is located between the axial endfaces of the pipe end portions 1,2, as illustrated. Each radial endface of the projection 10 is composed of a first section 11 which is inclined axially outwardly towards the associated axial end of the sleeve 3, and a second section 12 which extends from the first section to the ridge 13 and is inclined at a steeper angle than the section 11. As shown, the pipe end portions 1,2 respectively abut against the sections 12.

The sleeve surrounds the pipe end portions 1,2 with radial clearance which is axially subdivided by the projection 10 into two halves. Each of the latter receives a sealing ring 14 consisting of elastically deformable material—including synthetic plastics, metals or metal alloys—and preferably having an at least substantially quadratic cross section, as shown. Axially outwardly of the respective sealing ring 14 there is received in each clearance half a pressure-transmitting ring 15 which may consist of the same material as the ring 14 and preferably is of the illustrated cross section, resembling a parallelogram with one corner removed, and inclined axially outwardly.

Figure 3:
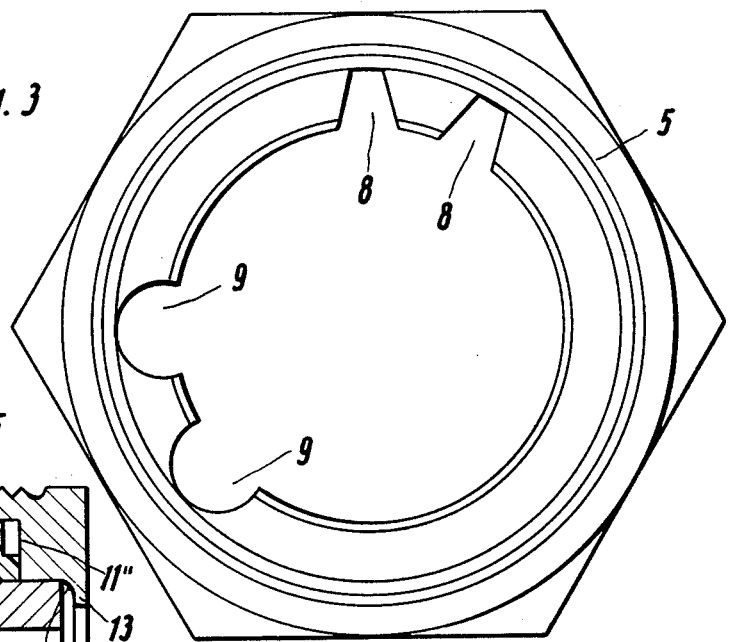
FIG. 3 is an axial endview of a nut for use in the preceding embodiments.

A cap nut 5 is threaded onto the outside of the sleeve 3 at each axial end thereof in mesh with the screw threads 4. At its trailing axial end each cap nut has a radially inwardly extending flange 6 which is inclined axially towards the associated leading axial end, as illustrated. The inner edge of the respective flange 6 is preferably sharpened and also preferably—but not necessarily—provided with circumferentially distributed cutouts 8,9 which extend from the inner edge 7 radially outwardly into the flange 6. FIG. 3 shows that the cutouts may be of sawtooth-shape outline as identified with reference numeral 8, of part circular outline as indentified by reference numeral 9, or that a mixture of both outlines may be present. Other shapes are also possible. According to the invention the root of each cutout 8,9, that is the point of maximum depth, is located on an imaginary circle whose diameter corresponds at least substantially to the inner diameter of the sleeve 3 (compare FIG. 1).

The embodiment in FIG. 2 differs from that of FIG. 1 in that the sections 11'—corresponding to the sections 11—are inclined oppositely the direction of inclination of the sections 11, while the sections 12' are inclined in the same manner and at the same angle as the sections 12. The sealing ring 14' corresponds to the sealing ring 14 of FIG. 1 but the pressure-transmitting ring 15' differs from the ring 15 of FIG. 1. FIG. 2 shows that the ring 15' is inclined axially in a sense opposite that of ring 15 in FIG. 1 so that that portion where the edge of the parallelogram is removed abuts against the ring 14'.

Figure 4:
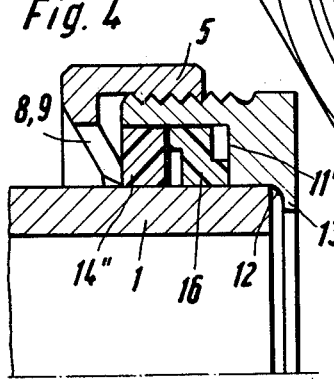
FIG. 4 is a view similar to FIG. 2, but showing yet a further embodiment of the invention.

In the embodiment of FIG. 4, finally, the pressure-transmitting ring 16 is located between the sealing ring 14'' and the section 11'' which here extends normal to the axis of the respective pipe end portion. The ring 16 is of Z-shaped cross section.

When the nut members 5 are tightened in these embodiments, the flanges are somewhat deformed in a sense that they assume a steeper angle of inclination to the axis of the respective pipe end portions 1 or 2. This results in "biting" or penetrating of the respective edge 7 into the outer surface of the associated pipe end portion whereby the nuts are locked against undesired loosening and movement of the sleeve relative to the pipe end portions.

The rings 14 and 15, 14', 15' or 14'' and 16, resist the tightening of the nut members 5 and are deflected thereby in a sense resulting in slight diagonal twisting of the rings 14 (or the analogous rings) in a sense forcing these rings into tight sealing engagement with the inner and outer circumferential surfaces of the sleeve and pipe end portions, respectively.

It will be appreciated that in assembling of the novel pipe union, the rings 14, 15 (or the analogous rings) are first inserted into the sleeve whereupon the pipe end portions—onto which the respective nut members have been previously placed—are introduced into the sleeve 3 to be surrounded by the same and the inserted rings. Now the nut members are tightened with the earlier described results.

It will be understood that each of the elements described above, or two or more together, may also find a useful application in other types of constructions differing from the types described above.

While the invention has been illustrated and described as embodied in a pipe union, it is not intended to be limited to the details shown, since various modifications and structural changes may be made without departing in any way from the spirit of the present invention.

What is claimed as new and desired to be protected by Letters Patent is set forth in the appended claims.

I claim:

1. A pipe union comprising, in combination, a pair of pipes having axially aligned proximal end portions; a sleeve surrounding said end portions with radial clearance and having a screw-threaded outer surface and a radially inwardly projecting annular portion provided with an inner annular ridge located between the axial endfaces of said end portions; a pair of sealing rings of elastically deformable material each received in said clearance at one axial side of said annular portion in abutment therewith; a pair of pressure-transmitting rings each also received in said clearance axially outwardly of and in contact with the respective sealing ring; and tapped nut means operative for threadedly meshing with the screw threads of said sleeve, said nut means comprising radially inwardly projecting unitary annular locking flange means inclined axially in a first direction towards said rings and having inner annular cutting edge means axially offset in direction towards said rings whereby, in response to relative rotation of said sleeve and nut means in a sense threading the latter further onto the former, said locking flange means initially effects stress transmission via said pressure-transmitting rings to said sealing rings in a sense resulting in sealing contact of the latter with said sleeve and end portions, and thereupon undergoes axial deformation in an opposite second direction with concomitant penetration of said cutting edge means substantially radially into said end portions.

2. A pipe union as defined in claim 1, said sealing rings being of substantially quadratic cross section.

3. A pipe union as defined in claim 2, said pressure-transmitting rings being of polygonal cross section and being received in said clearance axially outwardly of the respectively associated sealing rings.

4. A pipe union as defined in claim 1, wherein said annular portion comprises radial endfaces which are inclined in axial direction of said sleeve.

5. A pipe union as defined in claim 1, said nut means comprising two nut members having internal screw threads and each threaded onto said sleeve from one axial end thereof.

6. A pipe union as defined in claim 5, said locking flange means comprising a pair of locking flanges each located at the respectively trailing axial end of the associated nut member and inclined in direction toward the respectively leading axial end thereof.

7. A pipe union as defined in claim 6, said locking flanges being provided with a plurality of circumferentially distributed cutouts each extending from the respective cutting edge means into the associated flange in radially outward direction of the latter.

8. A pipe union as defined in claim 7, wherein said cutouts are of substantially sawtooth-shaped outline.

9. A pipe union as defined in claim 7, wherein said cutouts are of arcuate outline.

10. A pipe union as defined in claim 7, wherein said cutouts are of part-circular outline.

11. A pipe union as defined in claim 7, said sleeve having a predetermined inner diameter, and wherein said cutouts extend in radially outward direction of the respective flange to an imaginary circle whose diameter corresponds at least substantially to said predetermined inner diameter.

12. A pipe union as defined in claim 4, wherein each of said radial endfaces is inclined in axial direction of said sleeve towards the respectively associated axial end of said sleeve.

13. A pipe union as defined in claim 4, wherein each of said radial endfaces is inclined in axial direction of said sleeve away from the respectively associated axial end of said sleeve.